United States Patent [19]

Kyogoku et al.

[11] Patent Number: 5,037,664
[45] Date of Patent: Aug. 6, 1991

[54] PROCESS FOR PRODUCING NOVEL GEL-LIKE FOOD ARTICLES

[75] Inventors: Nobuo Kyogoku; Keiko Harada, both of Osaka, Japan

[73] Assignee: Suntory Limited, Japan

[21] Appl. No.: 420,940

[22] Filed: Oct. 13, 1989

[30] Foreign Application Priority Data

Oct. 15, 1988 [JP] Japan ................ 63-260191

[51] Int. Cl.$^5$ ................ A23L 1/05
[52] U.S. Cl. ................ 426/573; 426/656; 530/408
[58] Field of Search ........... 426/573, 574, 576, 657, 426/656; 530/408, 378

[56] References Cited

U.S. PATENT DOCUMENTS 3,885,054  5/1975  Cohly ................ 426/277
4,247,698  1/1981  Toyama et al. ................ 546/112

FOREIGN PATENT DOCUMENTS 135321     5/1979  German Democratic Rep.
58-149645  9/1983  Japan.
59-59151   4/1984  Japan.
59-66886   4/1984  Japan.
61-152247  7/1986  Japan.
63-125573  5/1988  Japan.
63-157981  6/1988  Japan.
63-258641  10/1988 Japan.

OTHER PUBLICATIONS

English Abstract of Japanese Patent Public Disclosure No. 61-47167.
Fujikawa, et al., Genipin, a New Type of Protein Crosslinking Reagent from Gardenia Fruits; Agric. Biol. Chem. 52(3) pp. 869-870. (1981).
New Tech. Japan, vol. 16, No. 7, Oct 88.
Summary Book Presenting Lectures re 35th Meeting (1988) of Nippon Shokuhrn Kogyogakkai p. 33.
A Summary of a Lecture Given at a Meeting Held on Jun. 7-9, 1988 by Kinki Kagaku Kyokai, p. 219.
Japan Industrial Newspaper, Jun. 8, 1988.

Primary Examiner—Donald E. Czaja
Assistant Examiner—Tony Weier
Attorney, Agent, or Firm—Cushman, Darby & Cushman

[57] ABSTRACT

Gel-like food article that has satisfactory functional characteristics such as high heat and acid resistance and yet which is safe to eat, and a process for producing this gel-like food article by crosslinking primary amino groups in food ingredients such as chitosan and proteins with an iridoid compound, which crosslinking may be combined with other methods of gelation.

8 Claims, No Drawings

PROCESS FOR PRODUCING NOVEL GEL-LIKE FOOD ARTICLES

FIELD OF THE INVENTION

The present invention relates to a process for producing gel-like food articles by crosslinking the primary amino group containing compounds in foodstuffs with iridoid compounds. More particularly, the present invention relates to a process for providing gel-like products having improved functional characteristics as food articles by crosslinking protein and/or chitosan in foodstuffs with iridoid compounds.

The present invention also provides a process in which before or after or simultaneously with gel formation by drying solutions containing primary amino group containing compounds such as protein and/or chitosan or by physical or chemical treatment of said solutions, the primary amino group containing compounds are crosslinked with iridoid compounds so as to reinforce or reduce the brittleness of the gel containing the primary amino group containing compounds, thereby producing gel-like food articles having improved water and heat resistance.

The present invention also relates to the gel-like food articles produced by these methods.

PRIOR ART

Although various protein resources and polysaccharides are known in the art, many of them find only limited use because they do not have high biological values or functional characteristics in an untreated state. Hence, attempts have been made to improve the functional characteristics of these proteins and polysaccharides by various techniques of modification including physicochemical and enzymological processes. While various functional characteristics can be improved by these processes, a typical example is an improvement in the gelling ability of proteins and polysaccharides, which can be utilized to produce gel-like food articles. The most common method for causing gelation is by the use of heat and one may have occasionally observed the formation of a hard film on the surface of cow's milk upon heating. "Yuba" which is a traditional Japanese foodstuff is unique in that it makes use of thermal denaturation of soybean protein. A typical method of chemical gelation is by coagulation with acids, alkalies or salts as is observed with collagen. Other traditional gel-like food articles include yogurt, cheese and "tofu". Conventional methods of protein gelation may be roughly classified as follows: thermal denaturation of proteins by heating; coagulation of proteins with divalent metallic ions such as calcium ion; coagulation by changing the pH of proteins close to the isoelectric point of proteins using acids or alkalies; and coagulating proteins by dehydrative action which occurs when the salt concentration is increased to lower the water reducibility of proteins. A method is also known in which chitosan is gelled with compounds that are capable of being converted to polyanionic polymers such as polyphosphoric acid or salts of these compounds (Japanese Patent Public Disclosure No. 61-153135). However, the gels that are obtained by these prior art methods are generally brittle and suffer from the disadvantages of low water resistance (they will readily swell or dissolve when immersed in water) and high sensitivity to temperature changes.

In response to the recent diversification in people's eating habits, efforts are being made to develop new technologies other than traditional food manufacturing processes and conventional modification techniques, typified by the intensive studies conducted to develop gel-like food articles having new functional characteristics (Japanese Patent Public Disclosure No. 59-59151). An attempt has also been made to produce tough and highly water-resistant protein films by crosslinking proteins and other components in foodstuffs so as to eliminate the defects of conventional gel-like food articles (Japanese Patent Public Disclosure No. 61-152247).

In these conventional methods for crosslinking high-molecular weight compounds, aldehydes such as glutaraldehyde and formaldehyde or other common chemicals such as acetic anhydride are used as crosslinking agents but they often cause problems from the viewpoint of food hygiene. A method that does not use a chemical crosslinking agent but which effects gelation by crosslinking the glutamine and lysine resides in protein through the action of transglutaminase has been reported (Japanese Patent Public Disclosure No. 58-149645). However, this method is applicable only to proteins. In addition, it involves an enzymatic reaction and therefore compared to in chemical reactions, reaction conditions such as the pH and temperature are limited. Further, the enzyme used is dependent on $Ca^{++}$ and requires the addition of a special $Ca^{++}$ source. In addition to these problems, the enzyme must be completely inactivated after the reaction.

It has been reported that the iridoid compounds derived from Gardenia jasminoides Ellis which are used as crosslinking agents in the processes of the present invention react with the primary amino group containing compounds and are further polymerized under oxidizing conditions to form blue dyes (Japanese Patent Publication No. 57-14781 and Japanese Patent Public Disclosure No. 61-47167). The safety of the blue dyes thus formed has been widely recognized as a result of their extensive use as natural pigments in foods. It has also been reported that the properties of such iridoid compounds can be used to immobilize enzyme proteins on supports (Japanese Patent Public Disclosure No. 63-157981).

SUMMARY OF THE INVENTION

An object of the present invention is to provide a process for producing a gel-like food article that is safe to eat and which has improved functional characteristics such as high heat and acid resistance by gelling a foodstuff with an iridoid compound used as an agent for crosslinking the primary amino group containing compounds in said foodstuff.

Another object of the present invention is to reduce the brittleness of gel and improve its resistance to heat, water, acids, etc. by combining the above-described process of gelation of foodstuffs with other physical or chemical gelation methods or with drying.

A further object of the present invention is to provide gel-like food articles produced by these processes.

DETAILED DESCRIPTION OF THE INVENTION

The present inventors conducted intensive studies to develop a new method of gelation with a view to producing gel-like food articles having different and desirable characteristics over existing products. As a result, they found that foodstuffs could be gelled by making use of the ability of iridoid compounds to work as crosslinkers of primary amino group containing compounds. The present invention has been accomplished on the basis of this finding.

The present inventors also found that the brittleness of the gel obtained by the conventional methods of gelation alone and its heat and water resistance could be improved by combining the above-described new method with known methods of gelation.

Thus, the present invention which is principally directed to the gelation of foodstuffs or enhancement of gel strength provides a process for producing gel-like food articles by using iridoid compounds as crosslinking agents for the formation of crosslinks between primary amino group containing compounds in foodstuffs.

According to this method of the present invention, a gel-like food article can be produced by crosslinking primary amino group containing compounds such as proteins and chitosan with iridoid compounds added to foodstuffs in a liquid or emulsion form that contain said primary amino group containing compounds at concentrations higher than a certain level.

According to another aspect of the present invention, the method of gelation by crosslinking primary amino group containing compounds with iridoid compounds may be combined with other methods of gelation or drying.

According to still another aspect of the present invention, the crosslinking of primary amino group containing compounds with iridoid compounds may be performed simultaneously with known methods of gelation which utilize physical or chemical treatments. Examples of the known methods of gelation which utilize physical or chemical treatments include heating to cause thermal denaturation of proteins, and adding to chitosan solutions those compounds which are capable of being converted to polyanionic polymers.

According to a further aspect of the present invention, gels that are produced by known methods of gelation which utilize physical or chemical treatments, or products dried by other methods are immersed in solutions containing iridoid compounds so that the primary amino group containing compounds in the gels or dried products are crosslinked with the iridoid compounds to strengthen the gel. Examples of the known methods of gelation which utilize physical or chemical treatments include: (1) dissolving proteins in acid or alkali solutions and extruding the protein solutions into salt-containing coagulation baths having different pHs from said protein solutions, thereby forming films or other gel-like products; (2) heating proteins to denature them thermally; and (3) adding to chitosan solutions those compounds which are capable of being converted to polyanionic polymers. An exemplary treatment for dehydration is the drying of solutions containing chitosan.

According to a still further aspect of the present invention, the gel obtained by crosslinking primary amino group containing compounds with iridoid compounds may be further heated to strengthen the gel by thermal denaturation of the proteins in it.

Any iridoid compounds having a crosslinking ability may be used in the processes of the present invention and illustrative examples are the aglycones of geniposide, gardenoside, geniposidic acid, etc. Of these compounds, genipin derived from Gardenia jasminoides Ellis which is the aglycone of geniposide is most preferred.

The present invention is applicable to any foodstuffs as long as they contain primary amino group containing compounds. They may be gelled to any desired shapes including sheets, fibers and granules. Pouring into molds having desired shapes such as sheets or blocks may be followed by the gelling reaction. A sheet-like food article may be produced in the following manner: (1) a sheet of gel or dried product obtained by methods other than gelation with an iridoid compound is immersed in a solution containing an iridoid compound; or (2) an iridoid compound is added to a solution containing protein or chitosan and the mixture is poured into a mold to make a sheet of a desired thickness, followed by reaction and optional heating in a suitable apparatus such as a thermostatic chamber.

The primary amino group containing compounds in the foodstuffs to be treated by the methods of the present invention need not be of the same type and proteins, chitosan and other primary amino group containing compounds may be present in admixtures.

Preferred examples of the primary amino group containing compounds that can be crosslinked by the processes of the present invention are proteins and chitosan. The origins of proteins are in no way limited and any kinds of proteins may be used including vegetable proteins and animal proteins. Exemplary vegetable proteins include defatted products of oil seeds (e.g. defatted soybean) and proteins separated therefrom. Illustrative animal proteins include milk protein, egg protein and collagen.

In gelling foodstuffs, iridoid compounds are used in amounts generally ranging from 0.001 to 1 part, preferably from 0.005 to 0.5 part, per part of the primary amino group containing compound. If proteins alone are contained as primary amino group containing compounds, it is preferred that their concentration be comparatively high, usually at least 2 wt %, with the range of 5–20 wt % being particularly preferred. If the protein concentration is less than 2 wt %, gel will not form even in the presence of iridoid compounds. If chitosan alone is contained as a primary amino group containing compound, it is dissolved at a concentration of 0.1–6.0 wt % in a weak acid such as citric acid. The following conditions may be used for gelling reaction: pH, 2–10, preferably 4–10 if protein is the main component, and less than 3 if chitosan is the main component; reaction temperature, 5°–100° C., preferably 5°–70° C.; reaction time, 10 minutes to 70 hours, with optional stirring, the range of which may vary depending upon pH and temperature.

The gel-like product obtained by the processes of the present invention may be molded into any shape such as a sheet, block or fiber. In addition, it is safe to eat and yet features new functional characteristics that have been absent from traditional gel-like food articles. Thus, this product, if used as a foodstuff, is anticipated to satisfy the demand raised by the diversification of modern eating habits. Further, the gel-like product obtained by the processes of the present invention is made less brittle and its resistance to water, heat and acids is improved and hence it finds utility not only in food articles or foodstuffs but also in various other fields such as pharmaceuticals.

In accordance with the present invention, a gel-like food article can be produced by crosslinking primary amino group containing compounds with an iridoid compound. In accordance with another aspect of the present invention, a gel-like food article can be produced by combining this method with other methods of gelation that have been known in the prior art. The gel-like food articles produced by the processes of the present invention have satisfactory characteristics such as improved strength and increased resistance to water, acids and heat and yet it is safe to eat.

The following examples are provided for the purpose of further illustrating the present invention but are in no way to be taken as limiting.

EXAMPLE 1

Soy protein isolates (Fujipro SE of Fuji Oil Co., Ltd.) and acid casein (Taiyo Kogyo K.K.) were dissolved in water at three concentrations (5, 10 and 15 wt %) to make 2-ml solutions (the acid casein was first added to distilled water and dissolved therein by adjusting the pH to 8.0 with sodium hydroxide). To each solution, genipin was added in an amount of 0.01 g per gram of protein and after reaction at 40° C. for 1 hour, evaluation was made as to whether gelation occurred. The results are shown in Table 2.

TABLE 1

| | Protein concentration (wt %) | | |
|---|---|---|---|
| | 5.0 | 10.0 | 15.0 |
| Soy protein isolates | X | ○ | ○ |
| Acid casein | X | X | ○ |

○: gel formed
X: remained as solution without gelatin

EXAMPLE 2

A 1-ml aqueous solution containing soy protein isolates at a concentration of 10 wt % was prepared. To this solution, genipin was added in amounts ranging from 0.0005 to 0.01 g per gram of protein and after reaction at 50° C. for 1 hour, evaluation was made as to whether gelation occurred. The results are shown in Table 2.

TABLE 2

| | Amount of genipin (g) | | | | |
|---|---|---|---|---|---|
| | 0.0005 | 0.001 | 0.002 | 0.005 | 0.01 |
| Soy protein isolates | X | Δ | ○ | ○ | ○ |

○: gelled momentarily
◎: gelled within 1 hour
Δ: only weak gel formed
X: remained as solution

EXAMPLE 3

Protein aqueous solutions (2 ml) were prepared using 10 wt % of soy protein isolates and various amounts (0, 1 and 4 wt %) of sodium casein. To each solution, genipin was added in an amount of 0.01 g per gram of protein and after reaction at 40° C. for 1 hour, evaluation was made as to whether gelation occurred. The results are shown in Table 3.

TABLE 3

| Ratio of soy protein isolates to sodium casein | Gel strength |
|---|---|
| 10:4 | ○ |
| 10:1 | ○ |
| 10:0 | ○ |

○: high;
◎: low

EXAMPLE 4

To an aqueous solution containing 10 wt % citric acid, both soy protein isolates (10 wt %) and chitosan (0-2 wt %) were added to prepare 2-ml aqueous solutions. To each solution, genipin was added in an amount of 0.01 g per gram of protein and after reaction at 40° C. for 1 hour, evaluation was made as to whether gelation occurred. The results are shown in Table 4.

TABLE 4

| Ratio of soy protein isolates to chitosan | Remarks |
|---|---|
| 10:2 | ○ |
| 10:1 | X |
| 10:0 | X |

○: gelled;
X: remained as solution

The sample solely consisting of protein was difficult to gel under an acidic condition (pH ≦4). On the other hand, the mixtures of soy protein isolates and chitosan gelled under an acidic condition (pH=3) by allowing genipin to act on the mixtures.

EXAMPLE 5

Chitosan (1 g) was dissolved in syrup consisting of citric acid (1 g), sucrose (30 g) and water (68 g). To the solution, genipin (0.1 g) was added and the mixture was subjected to a crosslinking reaction by heating at 60° C. for 10 minutes with stirring. As a result, a homogeneous gel formed. On the other hand, a genipin-free solution did not gel.

EXAMPLE 6

To an aqueous solution (98 g) containing 10 wt % citric acid, chitosan (2 g) was added to prepare an aqueous solution of 2 wt % chitosan. Genipin (0.1 g) was added to the solution and allowed to dissolve. The resulting solution was poured into a mold to a thickness of 800 μm and dried in a thermostatic chamber at 80° C. for 1 hour. The resulting film having a thickness of 100 μm was plastic and heat-resistant to such an extent that it did not dissolve even in boiling water (100° C.).

EXAMPLE 7

To 89.9 ml of water, 10 g of soy protein isolates (Fujipro SE of Fuji Oil Co., Ltd.) and 0.1 g of genipin were added and thoroughly mixed. The resulting mixture was poured into a mold to a thickness of 800 μm and allowed to stand in a thermostatic chamber at 100° C. for 1 hour until a film formed. The film was uniform in quality and did not have any flaws such as cracks.

COMPARATIVE EXAMPLE 1

To 90 ml of water, 10 g of soy protein isolates (Fujipro SE of Fuji Oil Co., Ltd.) was added and the mixture was treated as in Example 7 to form a film. The resulting film was not uniform in quality and had many cracks.

Each of the films obtained in Example 7 and Comparative Example 1 was cut to square (10 mm□) pieces, which were immersed in buffer solutions (pH 2-9) at 80° C. for 60 minutes. Evaluation was made as to whether the films dissolved or how much they elongated. The results are shown in Table 5.

TABLE 5

| pH | Comparative Example 1 | Example 7 |
|----|----------------------|-----------|
| 2  | dissolved            | 50%       |
| 4  | 5%                   | 0%        |
| 7  | 20%                  | 0%        |
| 8  | dissolved            | 30%       |

The figures in the table denote percent elongation which is expressed by:

Percent elongation =

$$\frac{\text{length after immersion} - \text{length before immersion}}{\text{length before immersion}} \times 100.$$

The data in Table 5 shows that crosslinking with genipin contributed to marked improvements in the brittleness and water resistance of protein films.

EXAMPLE 8

To water (84.9 ml), soy protein isolates (10 g), glycerin (5 g) and genipin (0.1 g) were added and thoroughly homogenized with a mixer, followed by pH adjustment to 7. The resulting aqueous solution was poured into a mold to a thickness of 800 μm and left to stand in a thermostatic chamber at 100° C. for ca. 50 minutes to cause both thermal protein denaturation and crosslinking, thereby forming a film. The film had a thickness of 100 μm and was highly plastic.

EXAMPLE 9

To 90 ml of a 1.5 wt % citric acid solution, 10 g of purified collagen (MCP-1 of Miyagi Kagaku Kogyo K.K.) was added and allowed to dissolve. The pH of the resulting solution was adjusted to 3 with citric acid. The so adjusted solution was poured into a mold to a thickness of 700 μm and then brought into contact with a coagulation bath prepared by adjusting the pH of a saturated sodium chloride solution to 10. The gelled collagen film was immersed in a 0.5% aqueous genipin solution (pH 7) at room temperature for 24 hours to cause crosslinking reaction. Thereafter, the film was washed with distilled water. The thus obtained film was highly plastic and did not dissolve in boiling water (100° C.). On the other hand, the collagen film which was not subjected to the crosslinking reaction with genipin dissolved completely in hot water (60° C.).

EXAMPLE 10

To 82.9 ml of a 10 wt % aqueous citric acid solution, 10 g of soy protein isolates, 2 g of chitosan, 5 g of glycerin and 0.1 g of genipin were added and thoroughly homogenized with a mixer. The resulting aqueous solution was poured into a mold to a thickness of 1000 μm and left to stand in a thermostatic chamber at 100° C. for ca. 50 minutes to form a film. The film had a thickness of 200 μm and was highly plastic. It was immersed in boiling water (100° C.) for 2 minutes but it did not dissolve at all.

EXAMPLE 11

To 82.9 ml of water, 10 g of soy protein isolates, 4 g of sodium casein, 3 g of glycerin and 0.1 g of genipin were added and thoroughly homogenized with a mixer, followed by pH adjustment to 7. The resulting aqueous solution was poured into a mold to a thickness of 800 μm and left to stand in a thermostatic chamber at 100° C. for ca. 40 minutes to form a film. The film had a thickness of 100 μm and was highly plastic.

What is claimed is:

1. A process for producing a gel food article comprising mixing a primary amino group containing compound with an iridoid compound, and allowing the crosslinking of the primary amino group containing compound with the iridoid compound to cause gelation wherein said primary amino group containing compound is chitosan and said iridoid compound is genipin.

2. A process for producing a gel food article comprising mixing a primary amino group containing compound with an iridoid compound, and allowing the crosslinking of the primary amino group containing compound with the iridoid compound to cause gelation wherein said primary amino group containing compound is a mixture of protein and chitosan and said iridoid compound is genipin.

3. A process for producing a gel food article comprising contacting chitosan with an iridoid compound in the presence of a compound that is capable of being converted to a polyanionic polymer to cause gelation of the chitosan by crosslinking of primary amino groups thereof with the iridoid compound and simultaneously causing gelation by the action of the compound that is capable of being converted to a polyanionic polymer.

4. A process according to claim 3 wherein said iridoid compound is genipin.

5. A process for producing a gel food article comprising contacting chitosan with an iridoid compound in the presence of a compound that is capable of being converted to a polyanionic polymer to cause gelation of the chitosan by crosslinking of primary amino groups thereof with the iridoid compound and simultaneously causing gelation by the action of the compound that is capable of being converted to a polyanionic polymer wherein said iridoid compound is genipin and said genipin is used in an amount ranging from 0.001 to 1 part per 1 part of said chitosan.

6. A process for producing a gel food article comprising contacting chitosan with an iridoid compound in the presence of a compound that is capable of being converted to a polyanionic polymer to cause gelation of the chitosan by crosslinking of primary amino groups thereof with the iridoid compound and simultaneously causing gelation by the action of the compound that is capable of being converted to a polyanionic polymer wherein said iridoid compound is genipin and said compound that is capable of being converted to a polyanionic polymer is polyphosphoric acid.

7. A process according to claim 4 wherein the gel food is in the form of a sheet, block or fiber.

8. A process according to claim 4 wherein the crosslinking is effected at a temperature between 5° and 100° C.

* * * * *